(12) United States Patent
McKnight

(10) Patent No.: US 6,682,791 B2
(45) Date of Patent: Jan. 27, 2004

(54) PACKAGES AND METHODS FOR DIFFERENTIAL OXYGEN SCAVENGING

(75) Inventor: David E. McKnight, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 117 days.

(21) Appl. No.: 09/778,326

(22) Filed: Feb. 7, 2001

(65) Prior Publication Data

US 2002/0155233 A1 Oct. 24, 2002

(51) Int. Cl.[7] ............ B29D 22/00; B29D 23/00; B32B 1/08; C09K 3/00
(52) U.S. Cl. ............ 428/35.2; 428/35.8; 428/35.9; 428/215; 428/219; 428/323; 428/349; 428/516; 252/188.28; 252/181.3; 252/383; 526/308; 526/348
(58) Field of Search ............ 428/35.2, 35.8, 428/35.9, 215, 219, 323, 349, 516, 921; 252/188.28, 181.3, 383; 526/308, 348

(56) References Cited

U.S. PATENT DOCUMENTS

| | | | |
|---|---|---|---|
| 5,049,624 A | | 9/1991 | Adams et al. |
| 5,211,875 A | | 5/1993 | Speer et al. |
| 5,310,497 A | | 5/1994 | VeSpeer et al. |
| 5,346,644 A | | 9/1994 | Speer et al. |
| 5,399,289 A | | 3/1995 | Speer et al. |
| 5,425,896 A | * | 6/1995 | Speer et al. ............ 252/188.28 |
| 5,529,833 A | * | 6/1996 | Speer et al. ............ 428/215 |
| 5,639,815 A | | 6/1997 | Cochran et al. |
| 5,700,554 A | | 12/1997 | Speer et al. |
| 5,736,616 A | | 4/1998 | Ching et al. |
| 5,776,361 A | | 7/1998 | Katsumoto et al. |
| 5,981,676 A | | 11/1999 | Gauthier et al. |
| 6,057,013 A | | 5/2000 | Ching et al. |
| 6,139,770 A | | 10/2000 | Katsumoto et al. |
| 6,255,248 B1 | * | 7/2001 | Bansleben et al. ............ 502/159 |
| 6,437,086 B1 | * | 8/2002 | Ching et al. ............ 528/272 |

FOREIGN PATENT DOCUMENTS

WO    WO 98/5179    11/1998

OTHER PUBLICATIONS

"Novel $O_2$ Scavenger to Redraw the MAP Map?" Packaging Digest, Mar. 1999, p. 88.
"Taking a Look into the Packaging Film Crystal Ball" Packaging Strategies Newsletter, Feb. 29, 2000, p. 3.
Thomas JA and Sylvia KE (1998) "A Polymeric Oxygen Scavenging System and its Packaging Applications," Abstract 77D–6 presented at the Institute of Food Technologies 1998 Annual Meeting.
Technical Literature for Cryovac Sealed Air Corp. OS1000 Oxygen Scavenging Film, accessed May 24, 2000 from www.vistaflexpackaging.com/products/food/os1000/os_main.html.
Sealed Air Corporation Press Release, accessed May 24, 2000 from www.sealedaircorp.com/whatnew/pressrelease/prq199_2.html.

* cited by examiner

*Primary Examiner*—Harold Pyon
*Assistant Examiner*—Catherine A. Simone
(74) *Attorney, Agent, or Firm*—Drinker Biddle & Reath LLP

(57) ABSTRACT

Packages and methods for protecting oxygen-sensitive products from damage or degradation due to oxygen contamination are provided. The packages contain at least two oxygen scavenging materials having different oxygen scavenging properties, arranged so that oxygen contamination from different sources is effectively eliminated. Preferred packages contain at least one oxygen scavenging material to effectively absorb head space oxygen, and at least one oxygen scavenging material to effectively absorb ingress oxygen.

21 Claims, 1 Drawing Sheet

PACKAGES AND METHODS FOR DIFFERENTIAL OXYGEN SCAVENGING

FIELD OF THE INVENTION

The invention relates to articles and methods for scavenge oxygen in packages containing oxygen-sensitive products, in particular food and beverage products.

BACKGROUND OF THE INVENTION

It is well known that limiting the exposure of oxygen-sensitive products to oxygen maintains and enhances the quality and "shelf-life" of the product. By limiting the oxygen exposure of oxygen sensitive products in a packaging system, the quality of the product is maintained and spoilage or damage due to oxygen contamination is avoided. In addition such packaging also keeps the product in inventory longer, thereby reducing costs incurred from waste and having to restock.

There are two main sources of oxygen contamination in a package: the head space oxygen and ingress oxygen. The head space oxygen is the oxygen remaining in the package after the product has been sealed off within packaging materials. Ingress oxygen is the oxygen which diffuses directly through the package walls or enters the package through voids or holes in the package (particularly at the seals). Contamination by head space oxygen occurs only when the package is initially sealed. By contrast, the ingress oxygen enters the package slowly from the time the package is sealed until it is opened by the consumer. Over time, a substantial amount of oxygen may enter the package as ingress oxygen. It is therefore desirable to remove the relatively small amount of head space oxygen quickly, before the high oxygen concentration can damage or degrade the packaged product, and to remove ingress oxygen more slowly but continuously while the package is on the shelf, to prevent a significant buildup of oxygen over time. A package capable of quickly removing head space oxygen and absorbing ingress oxygen over time would provide significant protection for oxygen-sensitive products.

In the food packaging industry, several means for limiting oxygen contamination in a packaged product have been developed. For example, products may be packaged under a modified atmosphere (called "modified atmosphere packaging" or MAP), or packaged in a vacuum. In these techniques, reduced oxygen environments are employed in the packaging process which reduce or eliminate contamination from head space oxygen. However, MAP or vacuum packaging processes are costly and do not prevent later contamination from ingress oxygen. In fact, a package with a partial or full vacuum would likely increase the oxygen permeation rate of the package walls.

In barrier film packaging processes, materials are used in the package walls which physically prevent oxygen from entering the package interior. Such processes, however, do not prevent contamination by head space oxygen, or prevent ingress of oxygen from holes or voids in the package seals. Furthermore, making a package wall completely impermeable to oxygen is often prohibitive, for example, in increased cost of materials and the unacceptably high weight and rigidity of the package. Therefore, a commercially viable package will typically have some degree of contamination from ingress oxygen.

Another means for limiting oxygen exposure in a package involves incorporating an oxygen scavenger in the packaging structure. An oxygen scavenger is a substance that consumes, depletes, or reduces the amount of oxygen from a given environment.

For example, an oxygen scavenging material may be included within the package cavity as a sachet. Insertion of sachets requires additional operations in the packaging process, thus increasing cost and production time. Sachets also take up space normally occupied by product. And while sachets may be effective at scavenging head space oxygen, they cannot stop ingress oxygen from entering the package and contacting the product before being scavenged. Furthermore, the use of sachets causes safety concerns, as the end-user may inadvertently consume the sachet along with the packaged product.

Alternatively, an oxygen scavenger may be incorporated into the packaging structure itself, for example by constructing the package walls with an oxygen scavenging polymer. Previous packaging systems incorporating oxygen scavenging materials use only one such material in a given package, thus producing a package with homogeneous oxygen scavenging properties.

U.S. Pat. No. 5,211,875 to Speer et al. discloses oxygen scavenger compositions comprising substituted or unsubstituted ethylenically unsaturated hydrocarbon polymers and a transition metal catalyst, which are activated on exposure to actinic radiation or an electron beam. These compositions are used to construct food packaging material with uniform oxygen scavenging properties.

U.S. Pat. No. 5,639,815 to Cochran et al. discloses a package wall comprising a single composition of an oxidizable polymer and a transition metal catalyst. The polymer/catalyst composition acts as an oxygen scavenger, and thus the package wall has homogeneous oxygen scavenging properties.

U.S. Pat. No. 5,700,554 of Speer et al. discloses an article useful for packaging oxygen-sensitive products, which contains an ethylenically unsaturated hydrocarbon polymer and a transition metal salt catalyst. Again, a given article contains only a single polymer/catalyst composition, and thus the oxygen scavenging properties of the package are homogeneous.

U.S. Pat. No. 5,776,361 to Katsumoto et al. discloses an oxygen scavenging composition or system for use in packaging oxygen-sensitive products, comprising at least one polyterpene and at least one catalyst. These packages also employ a single polyterpene composition in a given package, producing packages having homogeneous oxygen scavenging properties.

The packages disclosed in the U.S. Patents listed above may be engineered to have certain overall oxygen scavenging properties, so that either (but not both) the head space oxygen or ingress oxygen is optimally removed. Alternatively, materials with intermediate oxygen scavenging properties may be used in a given package to simultaneously combat both head space oxygen or ingress oxygen contamination, resulting in the suboptimal removal of oxygen from either source. What is needed, therefore, is a package with differential oxygen scavenging properties, which allows for the effective removal of both head space and ingress oxygen.

DEFINITIONS

"Head space oxygen" is the oxygen remaining in the package after the product has been sealed within the packaging materials.

"Ingress oxygen" is the oxygen which diffuses directly through the package walls or enters the package through voids or holes in the package.

"Oxygen scavenger" or "oxygen scavenging material" is a substance that consumes, depletes or reduces the amount of oxygen from a given environment.

"Oxygen scavenging capacity" (hereinafter "capacity") is the total amount of oxygen consumed per unit mass of scavenging material. Typical units of capacity are cubic centimeters (cc) of oxygen per gram of material.

"Oxygen scavenging rate" (hereinafter "rate") of an oxygen scavenging material is the amount of oxygen consumed per unit time per unit mass of scavenging material. Typical units of rate are cc/g/day.

"High rate oxygen scavenging materials" or "high rate materials" are oxygen scavengers chosen or designed to scavenge head space oxygen. "Low rate oxygen scavenging materials" or "low rate materials" are oxygen scavengers chosen or designed to scavenge ingress oxygen. Although generally high rate materials scavenge oxygen at faster rate than low rate materials, it is understood that there may be some overlap in the rates of high and low rate oxygen scavenging materials.

"Oxygen permeation rate" or "oxygen permeance" is the rate of diffusion of oxygen through a package wall at a certain pressure as measured in the absence of oxygen scavenging. Typical units of oxygen permeance are $cc/[m^2\ atm\ day]$.

SUMMARY OF THE INVENTION

In one aspect of the invention, there are provided packages for oxygen-sensitive products comprising at least two oxygen scavenging materials with different oxygen scavenging properties. The oxygen scavenging properties of each oxygen scavenging material include rate and capacity. Either the rate, capacity, or both may differ between the oxygen scavenging materials comprising the packages of the invention.

In one embodiment, the oxygen scavenging materials in the package comprise at least one high rate material for absorbing head space oxygen, and at least one low rate material for absorbing ingress oxygen. Preferably, the high rate material has a rate that is significantly greater than the rate of oxygen absorption by the packaged product, and a capacity capable of consuming substantially all the oxygen in the head space. The low rate material preferably has a rate at least equal to the rate of oxygen permeation rate of the package, and a capacity approximately equal to the product of 1) the oxygen permeation rate of the package, 2) the total area of the package, and 3) the expected shelf life of the package.

In another aspect, at least one high-rate oxygen scavenger is arranged in the package so as to scavenge head space oxygen, and at least one low-rate oxygen scavenger is arranged in the package so as to scavenge ingress oxygen. In one embodiment, the package is in laminate (i.e., multiple layer) form and comprises at least one layer of high rate material for absorbing head space oxygen and at least one layer of low rate material for absorbing ingress oxygen. Preferably, at least one layer of high rate material is placed nearer to the internal void of the package (i.e., nearer to the product) than the low rate material, and at least one layer of low rate material is placed nearer to the outside of the package than the high rate material.

In another aspect of the invention, the packages may comprise more than one high rate material and/or more than one low rate material, in any arrangement which allows effective absorption of head space and ingress oxygen.

Any adjustable-rate oxygen scavenging material may be used in the packages of the invention, for example compositions comprising one or more oxidizable organic polymers and a metal catalyst. Radiation-activatable compositions comprising oxidizable organic polymers and metal catalysts are preferred.

In another aspect, the invention provides methods of constructing packages having differential oxygen scavenging properties in which a film comprising at least one high rate material and at least one low rate material, optionally together with other layers, is formed into a package.

A multilayer film for constructing differential oxygen scavenging packages of the invention is also provided, comprising at least one high rate material and at least one low rate material optionally together with other layers.

In a further aspect of the invention, there are provided methods of protecting oxygen-sensitive products from damage or degradation due to oxygen contamination, by packaging the products in an article comprising at least two oxygen scavenging materials with different oxygen scavenging properties.

DETAILED DESCRIPTION OF THE INVENTION

Figure 1:
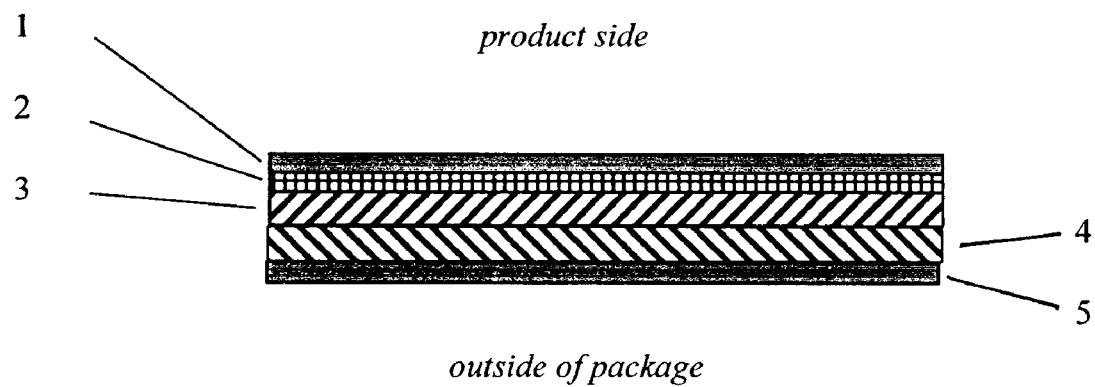
FIG. 1 is cross-section through the wall of an exemplary package, showing (from the layer closest to the food product): an inner sealant layer 1, a tie layer 2, a first oxygen scavenging layer of a high rate material 3, a second oxygen scavenging layer 4 of a low rate material, and an outer sealant layer 5.

The invention concerns packaging articles which have differential oxygen scavenging properties. Suitable articles include, but are not limited to, rigid containers, flexible packages, or combinations of both. Typical rigid or semi-rigid articles include plastic, paper or cardboard cartons or bottles such as juice containers, soft drink containers, thermoformed trays or cups which have wall thicknesses in the range of 100 to 1000 micrometers. Typical flexible packages include those used to package many food items, and may have thicknesses of 5 to 250 micrometers. Preferably, the walls of such articles comprise multiple layers of material. The packaging articles may be used to package oxygen-sensitive products; for example foods and beverages, pharmaceuticals, oxygen sensitive medical products, and corrodible metals or products such as electronic devices. Foods and beverages which are especially susceptible to oxygen contamination include beers (especially lager beers), wines (especially white), fruit juices, carbonated soft drinks, fruits, nuts, vegetables, meat products, baby foods, coffee, sauces, and dairy products.

The packages of the invention comprise at least two oxygen scavenging materials wherein each material has different oxygen scavenging properties. Either the rate, capacity, or both may differ between the oxygen scavenging materials comprising the packages of the invention. The different oxygen scavenging materials are chosen or designed for their ability to mitigate oxygen contamination from different sources, for example head space oxygen or ingress oxygen. Preferably, the package comprises one or more high rate oxygen scavenging materials for scavenging head space oxygen and one or more low rate oxygen scavenging materials for scavenging ingress oxygen.

It is desirable to remove head space oxygen as quickly as possible, to minimize damage or degradation of the packaged product. To absorb oxygen from the head space, therefore, it is preferable to use a high rate oxygen scavenging material which has an oxygen scavenging rate significantly greater than the rate of oxygen absorption by the packaged product. This is especially important in the food packaging industry, where food or beverages exposed to oxygen may exhibit off-color, off-odor or off-taste to the consumer.

As used herein, an oxygen scavenging material that produces a rate significantly greater than that of the packaged product is one which scavenges oxygen at a rate at least about 0.5× greater than the product, preferably at least about 1× greater than the product, and most preferably at least about 2× greater than the product. Particularly preferred high rate materials scavenge oxygen at a rate between about 1.5× and about 10× greater than the product, for example between about 2× and about 7× greater than the product. Techniques to determine the rate of product oxygen absorption are well-known in the art.

High rate materials with very high rates, e.g., greater than 10× the scavenging rate of the packaged product, may be used. However, the cost of using such a material in the package may outweigh the benefits, especially when the average consumer may be satisfied with the limited product degradation that may take place using a high rate material with a lesser scavenging rate. Thus, the balance between unit cost and the amount of product degradation that a consumer will accept is another consideration in choosing the scavenging rate of the high rate material used.

Factors such as package size and configuration, the type and amount of packaged product, the amount of oxygen expected to be trapped in the head space, anticipated storage conditions, etc. may also influence the chosen headspace oxygen scavenging rate. One of ordinary skill in the art is familiar with these factors, and may readily take them into consideration to choose a rate for the high rate material that will adequately protect the packaged product from head space oxygen.

The rate of the high rate material may also be chosen without reference to the product oxygen absorption rate. For example, an at least 50%, preferably an at least 90% reduction in headspace oxygen level in the first 24 hours after packaging is suitable for use in the packages and methods of the invention. Preferably, an oxygen scavenging material with a rate that produces greater than about 90%, preferably greater than about 95%, and most preferably greater than about 99% reduction in headspace oxygen level within a period of one week is used in the packages and methods of the invention.

For example, an oxygen scavenging material useful in absorbing head space oxygen may have a rate of at least about 30 cc/g/day, preferably between about 35 and 45 cc/g/day, and most preferably at least about 55 cc/g/day.

The capacity of the oxygen scavenging material used to remove head space oxygen must be at least great enough to consume substantially all the oxygen expected to be contained within the head space. As used herein, the capability to consume substantially all the head space oxygen means that at least about 90%, preferably at least about 95%, and most preferably at least about 99% of the oxygen contained in the head space can be consumed by the oxygen scavenging material.

To remove ingress oxygen, it is desirable to use an oxygen scavenging material with a low rate, preferably one which matches the rate of ingress oxygen permeation of the package. Oxygen permeance of a package can be estimated by techniques known in the art, for example as disclosed in U.S. Pat. No. 5,636,815 of Cochran et al., the disclosure of which is herein incorporated by reference.

Generally, oxygen permeance may be measured by constructing a package or package wall with an inactive oxygen scavenging material (e.g., an oxidizable polymer without a metal catalyst) and exposing a defined area of the package to an oxygen pressure differential under standard conditions of temperature and humidity. For example, a package or package wall may be exposed to an essentially zero partial pressure of oxygen ($PO_2$) on one side, and a $PO_2$ of 0.21 atmospheres on the other, at 23° C. and 50% humidity. The rate at which oxygen crosses the package wall under these conditions may be used to estimate the rate of ingress oxygen entry into the package on the shelf. The rate of the low rate material needed to effectively scavenge ingress oxygen can therefore be based on such a measure.

For example, if the oxygen permeance of a package is measured at 1.5 cc/[$m^2$ atm day], the rate of the oxygen scavenging material must be approximately equal to or greater than this value. Preferably, the rate of the low rate material is at least equal to the oxygen permeation rate.

The capacity of the low rate material can be represented as the product of:

1) the oxygen permeation rate of the package (in cc/[$m^2$ atm day]);
2) the total package area (in $m^2$), and
3) the expected shelf-life of the package (in days).

For example, if the if the oxygen permeance of a package is measured at 1.5 cc/[$m^2$ atm day], the total package area is 0.3 $m^2$ and the package is expected to spend an average of 8 days on the shelf, the capacity of the low rate material should be approximately 3.6 cc oxygen.

Generally, the rate required for high rate materials (head space oxygen scavengers) will be greater than that required for low rate materials (ingress oxygen scavengers). It is understood, however, that there may be some overlap in the rates of high and low rate oxygen scavenging materials used to absorb the head space and ingress oxygen, respectively.

The rate and capacity of oxygen scavenging materials useful in the invention may be determined by techniques well-known in the art. For example, the oxygen scavenging properties of a material may be measured by hermetically sealing a defined amount of the material into a container having a known amount of oxygen, for example as described in Example 7 of U.S. Pat. No. 5,639,815, Example 2 of U.S. Pat. No. 5,211,875 or Examples 30–31 of U.S. Pat. No. 5,736,616, the disclosures of which are herein incorporated by reference. The depletion of oxygen over time is followed until the oxygen level in the container remains constant, at which time it is assumed the oxygen scavenging material can consume no more oxygen. The rate is determined by calculating the amount of oxygen removed from the environment of the sealed container per unit time for a given mass of oxygen scavenging material. The capacity is determined by subtracting the oxygen level at the end of the test from the beginning oxygen level. Other equally effective methods of determining rate and capacity may also be used.

The different oxygen scavenging materials are preferably arranged within the package so as to most effectively remove oxygen from a particular source. For example, a high rate material may be placed so as to primarily scavenge the head space oxygen, and a low rate material may be placed so as to primarily scavenge the ingress oxygen. The most effective placement of oxygen scavenging materials in a package depends on the package configuration (e.g., surface area-to-volume ratio), product type, packaging conditions, anticipated storage conditions, and other such factors. Thus, one of ordinary skill in the art is able to ascertain the best placement of the oxygen scavenging materials in the package.

A useful placement of the different oxygen scavenging materials in the package is a multilayer or "laminate" arrangement, in which the package comprises at least one layer of high rate material and at least one layer of low rate material. Preferably, layers of high rate material are placed nearer to the internal void of the package than the low rate material layers, and layers of low rate material are placed nearer to the outside of the package than the high rate material layers. Another useful placement of the different oxygen scavenging materials in the package is a "block" arrangement, where entire sections of the package are formed primarily from high or low rate materials. For example, if the package is to be stored upright, the top portion of the package, preferably the top ¼ to ⅓, may comprise a high rate material. The remainder of the package may comprise a low rate material. The laminate arrangement is preferred.

A package may also comprise more than one high rate material and/or more than one low rate material, in any arrangement which allows effective absorption of head space and ingress oxygen. For example, if a package is expected to encounter low temperatures in shipping, the package may comprise two separate sets of high and low rate oxygen scavenging materials; one set of high and low rate materials that are effective oxygen scavengers at high temperatures (e.g., above 10° C.), and one set of high and low rate materials that are effective scavengers at low temperatures (e.g., below 10° C.). Examples of oxygen scavenging materials that are effective at low temperatures are found in U.S. Pat. No. 5,310,497 of Ve Speer et al., the disclosure of which is incorporated herein by reference in its entirety. It is not necessary that the different high (or low) rate materials have identical rates and capacities, as long as the rates and capacities of each are appropriate for the material's intended use (i.e., the absorb head space or ingress oxygen, as described above).

Any adjustable-rate oxygen scavenging material may be used in the packages of the invention and it is within the skill in the art to choose two or more such oxygen scavenging materials with appropriate rates and capacities for a particular package and product. For example, in packaging processes which incorporate a significant amount of head space oxygen, the amount of high rate material in the package may be increased accordingly. For products which are expected to spend much time in transit or on the shelf before reaching the consumer, the amount of low rate material in the package may be increased. It is understood that the oxygen scavenging properties of a given package may also be adjusted by holding the amount of oxygen scavenging material constant and varying the chemical composition of the material to attain the desired rates and capacities.

Suitable oxygen scavenging materials are well-known to those skilled in the art, and include compositions of one or more oxidizable organic polymers in the presence of a metal catalyst. The oxygen scavenging properties of certain oxidizable polymer/catalyst compositions are activated upon exposure to actinic (e.g., ultra violet or visible light) or electron beam radiation; see, for example, U.S. Pat. No. 5,981,676 of Gauthier et al., U.S. Pat. No. 5,776,361 of Katsumoto et al. and U.S. Pat. No. 5,736,616 of Ching et al., the disclosures of which are herein incorporated by reference in their entirety. Radiation-activatable compositions of oxidizable organic polymers and metal catalysts are preferred.

Oxidizable organic polymers suitable for use in radiation activatable, oxygen scavenging compositions are well-known in the art, and include substituted or unsubstituted ethylenically unsaturated hydrocarbons and mixtures thereof, such as polybutadiene, polyisoprene, and styrene-butadiene block copolymers, as well as those described in U.S. Pat. Nos. 5,211,875 and 5,346,644 to Speer et al. (the disclosures of which are hereby incorporated by reference in their entirety) and U.S. Pat. No. 5,981,676 to Gauthier et al., supra. Other suitable oxidizable organic polymers include polyterpenes as disclosed in U.S. Pat. No. 5,776,361 supra; poly(meta-xylenediamine-adipic acid) (also known as MXD6); acrylates which can be prepared by transesterification of poly(ethylene-methyl acrylate), such as poly (ethylene-methyl acrylate-benzyl acrylate), poly(ethylene-methyl acrylate-tetrahydrofurfuryl acrylate), poly(ethylene-methyl acrylate-nopolacrylate) and mixtures thereof, as disclosed in U.S. Pat. No. 5,627,239, the disclosure of which is hereby incorporated by reference in its entirety, and polyethylenic compounds with pendant orterminal moieties comprising benzylic, allylic, or ether-containing radicals as disclosed in U.S. Pat. No. 5,736,616 supra. Mixtures of two or more oxidizable polymers may also be used. Particularly preferred oxidizable polymers are substituted or unsubstituted ethylenically unsaturated hydrocarbons, polyvinylidene chloride and polyethylenic compounds with pendant 3-cyclohexenyl moieties such as ethylene-cyclohexenylmethyl acrylate copolymer (ECHA) or ethylene-methylacrylate-cyclohexeneylmethyl acrylate terpolymer (EMCM).

Metal catalysts are also well-known in the art, and include transition metal catalysts which can readily interconvert between at least two oxidation states. The transition metal catalyst may also be in the form of a transition metal salt. The oxidation state of the transition metal in the catalyst, when mixed with the oxidizable polymer, is not necessarily that of the active form. Suitable transition metal catalysts comprise transition metals selected from the first, second or third transition series of the periodic table of the elements, and include manganese II or III, iron II or III, cobalt II or III, nickel II or III, copper I or II, rhodium II, III or IV, and ruthenium. The transition metal is preferably iron, nickel or copper, more preferably manganese and most preferably cobalt. Suitable counterions for the metal include chloride, acetate, stearate, palmitate, 2-ethylhexanoate, neodecanoate or naphthenate. Particularly preferable transition metal salts include cobalt (II) 2-ethylhexanoate and cobalt (II) neodecanoate. The transition metal salt may also be an ionomer, in which case a polymeric counterion is employed. Such ionomers are well known in the art.

The oxidizable polymer/catalyst compositions may further comprise one or more non-oxygen scavenger diluent polymers known to be useful in packaging film forming materials. Generally, these polymers are semi-crystalline materials that are thermoplastic and render the oxygen scavenging film more adaptable for use as packaging layers. Suitable diluent polymers include polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene(meth)-acrylic acid and ethylene-(meth)acrylic acid ionomers. In rigid articles such as beverage containers, PET is often used. Blends of different diluent polymers may also be used. The selection of the polymeric diluent largely depends on the packaging article to be manufactured and its intended use. Such selection factors are well known in the art. For instance, certain polymers are known to provide clarity, cleanliness, barrier properties, mechanical properties and/or texture to the resultant article.

Photoinitiators may optionally be added to the oxidizable polymer/catalyst composition, to decrease the activation time of the metal catalyst. Such photoinitiators are well known in the art, and are disclosed, for example, in U.S. Pat. No. 5,981,676, supra. Preferred are low-migratory photoinitiators such as are disclosed in WO 98/5179 and U.S. Pat. No. 6,139,770, the disclosures of which are herein incorporated by reference in their entirety.

A particularly preferred low-migratory photoinitiator is tribenzoyl triphenylbenzene (BBP$^3$).

Further additives may optionally be included in the oxidizable polymer/catalyst composition to impart properties desired for the particular article being manufactured. Such additives are well-known in the art and include fillers, pigments, dyestuffs, antioxidants, stabilizers, processing aids, plasticizers, fire retardants, anti-fog agents, etc. Preferably, these additives do not comprise more than 10% of the scavenging component, with amounts of additives being most preferably less than 5% by weight of the scavenging component.

The mixing of the oxidizable polymers, catalysts and other components listed above is preferably accomplished by melt-blending at a temperature in the range of 50° C. to 300° C. However, alternative blending techniques within the skill in the art, such as the use of a solvent followed by evaporation, may also be employed. The blending may immediately precede the formation of the finished article or preform, or precede the formation of a feedstock or masterbatch for later use in the production of finished packaging articles. When making film layers or articles from oxygen-scavenging compositions, (co)extrusion, solvent casting, injection molding, stretch blow molding, orientation, thermoforming, extrusion coating, coating and curing, lamination or combinations thereof may follow the blending.

For oxygen scavenging materials comprising a radiation-activated composition of an oxidizable polymer and a metal catalyst, the oxygen scavenging properties depend primarily on the relative amounts of oxidizable polymer and catalyst. The primary function of the oxidizable polymer is to react irreversibly with oxygen during the scavenging process, and the primary function of the catalyst is to facilitate the irreversible reaction of oxygen with the polymer. Therefore, capacity is directly proportional to the amount of oxidizable polymer in the composition, and rate is directly proportional to the amount of catalyst in the composition. It is within the skill in the art to vary the polymer/catalyst ratio to produce an oxygen scavenging material with a desired capacity and rate. Typically, the amount of oxidizable polymer may range from 1 to 99%, preferably from 10 to 99%, by weight of the composition and the amount of catalyst may range from 0.001 to 1% (10 to 10,000 ppm) of the scavenging component, based on the metal content only (excluding ligands, counterions, etc.). If one or more diluent polymers are used, those polymers may comprise, in total, as much as 99% by weight of the scavenging component. In the event the amount of catalyst is about 0.5% or less, it follows that the oxidizable polymer optionally together with other components will comprise substantially all of the composition. Preferred high rate compositions are those with a polymer/catalyst ratio of 3:1 or 9:2, and preferred low rate compositions are those with a polymer/catalyst ratio of 9:1.

The oxygen scavenging material may be used in flexible or rigid single layer or multilayer articles. The layers comprising the oxygen scavenging material may be in any useful form; for example, stock films, including "oriented" or "heat shrinkable" films, which may ultimately be processed as bags or other flexible packages. The layers of oxygen scavenging material may also be in the form of sheet inserts to be placed in a packaging cavity. In rigid articles such as beverage containers and thermoformed trays or cups, the layer of oxygen scavenging material may be within the container walls or in the form of a liner placed with or in the container lid or cap. The oxygen scavenging material layer may also be coated or laminated onto any one of the articles mentioned above, or coated onto a solid support, such as a polymeric (i.e., polyester) film. For example, a preferred oxygen scavenging material comprises polyvinylidene chloride-coated polyester film and a cobalt (II) neodecanoate catalyst.

Multilayered articles of the invention may also comprise one or more oxygen barriers; i.e., layers of material having an oxygen transmission rate equal to or less than 500 cubic centimeters per square meter ($cc/m^2$) per day per atmosphere at room temperature (i.e., about 25° C.). Typical oxygen barriers are well-known in the art, and may comprise, for example, poly(ethylene vinyl alcohol), polyacrylonitrile, polyvinyl chloride, poly(vinylidene dichloride), polyethylene terephthalate, silica, and polyamides. Copolymers of certain materials described above, metal foil layers, Metallized films, silicon and aluminum oxide coated films, liquid crystal polymer layers, and layers of nano-composites may also be employed as oxygen barriers.

Multilayered articles of the invention may also comprise one or more layers which are permeable to oxygen, for example layers comprising styrene-butadiene copolymers; polystyrenes, including substituted polystyrenes (e.g., with oligosiloxane, -silane, -germano-siloxane, -germane, or -stannane as p-substituents); ethylene/alpha-olefin copolymers, polyethylene-polypropylene copolymers and other materials well-known in the art.

The layers used to construct the multilayered articles of the invention may be prepared using techniques well-known in the art, such as coextrusion, coating and/or lamination. In addition to oxygen barrier and oxygen permeable layers, further layers (such as adhesive layers) may be adjacent to any of the layers discussed above. Compositions suitable for adhesive layers include those well-known in the art, such as anhydride functional polyolefins.

Multilayer dual oxygen scavenging films comprising at least one layer of high rate material and at least one layer of low rate material, optionally together with other layers, are considered part of the invention. An exemplary multilayer dual oxygen scavenging film is given in Example 1 below. Methods of constructing packages having differential oxygen scavenging properties with such films are also provided, which methods comprise providing a film comprising at least one layer of high rate material and at least one layer of low rate material, optionally together with one or more other layers, and forming the film into a package.

In one embodiment, there is provided a multilayered flexible package for food or beverages comprising at least two layers. The layer closest to the inner void of the package may comprise a high rate oxygen scavenging material for scavenging head space oxygen, for example an oxidizable polymer/transition metal catalyst composition. The layer closest to the outside of the package may comprise a low rate oxygen scavenging material for scavenging ingress oxygen, for example an oxidizable polymer/transition metal catalyst composition with a low rate, wherein the rate matches the rate of ingress oxygen migration. Other barrier and sealant layers may be present as necessary for the particular application.

An exemplary package wall configuration for a multilayer package is shown in FIG. 1, which is a cross-section through the package wall. With reference to FIG. 1, the package wall may comprise the following layers, beginning with the layer closest to the product: an inner sealant layer 1; a first scavenging layer 3 having a 9:2 oxidizable polymer/metal catalyst ratio for a high absorption rate overlaying the inner sealant layer; a "tie layer" 2 optionally present in between the inner sealant layer and first scavenging layers to bind these layers together; a second scavenging layer 4 having a 9:1 polymer catalyst ratio for a low absorption rate overlaying the first scavenging layer; and optionally an outer sealant layer 5 overlaying the second scavenging layer. The oxygen scavenging layers preferably comprise commercially available, UV-activated oxygen scavenging polymer/catalyst compositions, in particular polyvinylidene chloride-coated polyester films employing a cobalt metal salt catalyst, such as the "OS1000" oxygen scavenger marketed by Cryovac—Sealed Air Corp. of Simpsonville, S.C., and more preferably comprise compositions of ethylene-cyclohexenylmethyl acrylate copolymer (ECHA) or ethylene-methylacrylate-cyclohexeneylmethyl acrylate terpolymer (EMCM), both of which are available from Chevron Chemical Company of San Ramon, Calif.

There are also provided methods of protecting oxygen-sensitive products from damage or degradation due to oxygen contamination, comprising the steps of providing a packaging article comprising at least two oxygen scavenging materials with different oxygen scavenging properties according to the invention, and packaging the products in the article.

The invention is illustrated by the following non-limiting example.

EXAMPLE 1

Multilayered Differential Oxygen Scavenging Film

A five-layered "ABCDE" film is made with the following specifications. Layer A is the outer layer of the package, and layer E is the innermost layer of the package (i.e., the layer closest to the product).

| Layer | Thickness | Composition |
| --- | --- | --- |
| A | 0.5 mils | 20% LLDPE*:80% LDPE** blend |
| B | 0.2 mils | low rate oxygen scavenging material of 9:1 ratio of oxygen scavenging polymer to metal catalyst |
| C | 2.5 mils | 20% LLDPE:80% LDPE blend |
| D | 0.1 mils | high rate oxygen scavenging material of 9:2 ratio of oxygen scavenging polymer to metal catalyst |
| E | 0.5 mils | 20% LLDPE:80% LDPE blend |

*linear low density polyethylene
**low density polyethylene

The layers are coextruded in a blown-film cast sheet coating or extrusion. The "A" side of the "ABCDE" film is then adhesively laminated onto a PET/ink/adhesive/metallized surface/PET film. The final laminate is used to construct differential oxygen scavenging packages for brick packaged coffee, for example by horizontal or vertical form fill seal techniques.

All references cited herein are incorporated by reference. The present invention may be embodied in other specific forms than those explicitly described herein without departing from the spirit or essential attributes thereof and, accordingly, reference should be made to the appended claims, rather than to the foregoing specification, as indication the scope of the invention.

I claim:

1. A package having an interior and an exterior for packaging an oxygen-sensitive product, in which the product is sealed within the package interior and forms a space between the product and a portion of the package defining a head space wherein head space oxygen is contained, and in which ingress oxygen permeates the package to gain ingress to the package interior from the package exterior, wherein the package comprises a first layer for scavenging the head space oxygen having an oxygen consumption rate and an oxygen capacity, and a second layer for scavenging the ingress oxygen having an oxygen consumption rate and an oxygen capacity, and wherein at least one of the oxygen consumption rate or oxygen capacity of the first and second layer is different.

2. The package of claim 1, wherein the oxygen-sensitive product has an oxygen consumption rate, and the package has an ingress oxygen permeation rate and an expected shelf-life, and wherein
   a) the first layer for scavenging head space oxygen has an oxygen consumption rate greater than about 0.5× the oxygen consumption rate of the packaged oxygen-sensitive product, and an oxygen capacity capable of absorbing at least about 90% of the head space oxygen; and
   b) the second layer for scavenging ingress oxygen has an oxygen consumption rate at least equal to the rate of ingress oxygen permeation of the package, and an oxygen capacity approximately equal to a value determined by multiplying the rate of ingress oxygen permeation of the package, the total area of the package, and the expected shelf life of the package.

3. The package of claim 1, wherein the oxygen scavenging layer are compositions comprising one or more radiation activatable, oxidizable organic polymers and a transition metal catalyst.

4. The package of claim 3, wherein the one or more oxidizable organic polymers are selected from the group consisting of ethylenically unsaturated hydrocarbons, polyvinylidene chloride, and polyethylenic compounds with pendant 3-cyclohexenyl moieties.

5. The package of claim 4, wherein the polyethylenic compounds with pendant 3-cyclohexenyl moieties comprise ethylene-cyclohexenylmethyl acrylate copolymer (ECHA) or ethylene-methylacrylate-cyclohexeneylmethyl aerylate terpolymer (EMCM).

6. The package of claim 3, wherein the transition metal catalyst is selected from the group consisting of iron, nickel copper, manganese and cobalt.

7. The package of claim 6, wherein the transition metal catalyst is a transition metal salt.

8. The package of claim 7, wherein the transition metal salt is cobalt (II) 2-ethylhexanoate or cobalt (II) neodecanoate.

9. The package of claim 3, wherein said compositions comprise a polyvinylidene chloride-coated polyester film and a cobalt metal salt catalyst.

10. The package of claim 3, wherein the compositions further comprise a photoinitiator.

11. The package of claim 10 wherein the photoinitiator is a low-migratory photoinitiator.

12. The package of claim 11 wherein the low-migratory photoinitiator is tribenzoyl triphenylbenzene ($BBP^3$).

13. The package of claim 1, wherein the package comprises, in order from the package interior to the package exterior, the first layer for scavenging head space oxygen and the second layer for scavenging ingress oxygen.

14. A package having an interior and an exterior for packaging an oxygen-sensitive product, in which the product is sealed within the package interior and forms a space between the product and a portion of the package defining a head space wherein head space oxygen is contained, in which ingress oxygen permeates the package to gain ingress into the package interior from the package exterior, wherein the package comprises:

a) an inner sealant layer closest to the product;
   b) a first scavenging layer comprising a first material for scavenging head space oxygen having an oxygen consumption rate and an oxygen capacity overlaying the inner sealant layer;
   c) a tie layer optionally present in between the inner sealant layer and first scavenging layers to bind these layers together;
   d) a second scavenging layer comprising a second material for scavenging ingress oxygen having an oxygen consumption rate and an oxygen capacity overlaying the first scavenging layer; and
   e) an outer sealant layer overlaying the second scavenging layer,
   wherein at least one of the oxygen consumption rate or oxygen capacity of the first and second materials is different.

15. The package of claim 14 wherein the first and second scavenging layers comprise one or more radiation activatable, oxidizable organic polymers and a metal catalyst.

16. A method of protecting oxygen-sensitive products from damage or degradation due to oxygen contamination, comprising packaging the products in a package having an interior and an exterior for packaging an oxygen-sensitive product, in which the product is sealed within the package interior and forms a space between the product and a portion of the package defining a head space wherein head space oxygen is contained, in which ingress oxygen permeates the package to gain ingress into the package interior from the package exterior, wherein the package comprises a first material for scavenging head space oxygen having an oxygen consumption rate and an oxygen capacity and a second material for scavenging ingress oxygen having an oxygen consumption rate and an oxygen capacity, and wherein at least one of the oxygen consumption rate or oxygen capacity of the first and second materials is different.

17. The method of claim 16, wherein the first material for scavenging head space oxygen and the second material for scavenging ingress oxygen are compositions comprising one or more radiation activatable, oxidizable organic polymers and a metal catalyst.

18. The method of claim 17 wherein the package comprises multiple layers, and at least one layer comprises the first material for scavenging head space oxygen and at least one layer comprises the second material for scavenging ingress oxygen.

19. A multilayer film for constructing a package having an interior and an exterior for packaging an oxygen-sensitive product, in which the product is sealed within the package interior and forms a space between the product and a portion of the package defining a head space wherein head space oxygen is contained, and in which ingress oxygen permeates the package to gain ingress into the package interior from the package exterior, wherein the film comprises at least one layer comprising a first material for scavenging head space oxygen having an oxygen consumption rate and an oxygen capacity and at least one layer comprising a second material for scavenging ingress oxygen having an oxygen consumption rate and an oxygen capacity, and wherein at least one of the oxygen consumption rate or oxygen capacity of the first and second materials is different.

20. The film of claim 19, wherein the first material for scavenging head space oxygen and the second material for scavenging ingress oxygen are compositions comprising one or more radiation activatable, oxidizable organic polymers and a metal catalyst.

21. The package of claim 1, wherein the oxygen-sensitive product has an oxygen consumption rate, and the package has an oxygen permeation rate and an expected shelf-life, and wherein a) the first layer for scavenging head space oxygen has an oxygen consumption rate that reduces head space oxygen level at least about 90% over a period of one week, and an oxygen capacity capable of absorbing at least about 90% of the oxygen in the head space; and
   b) the second layer for scavenging ingress oxygen has an oxygen consumption rate at least equal to the rate of oxygen permeation of the package, and an oxygen capacity approximately equal to a value determined by multiplying the rate of oxygen permeation of the package, the total area of the package, and the expected shelf life of the package.

* * * * *